March 13, 1956 — I. GEBEL — 2,737,826
CONTROL UNIT FOR ELECTRICAL INSTRUMENTALITIES
Filed Feb. 14, 1955 — 2 Sheets-Sheet 1
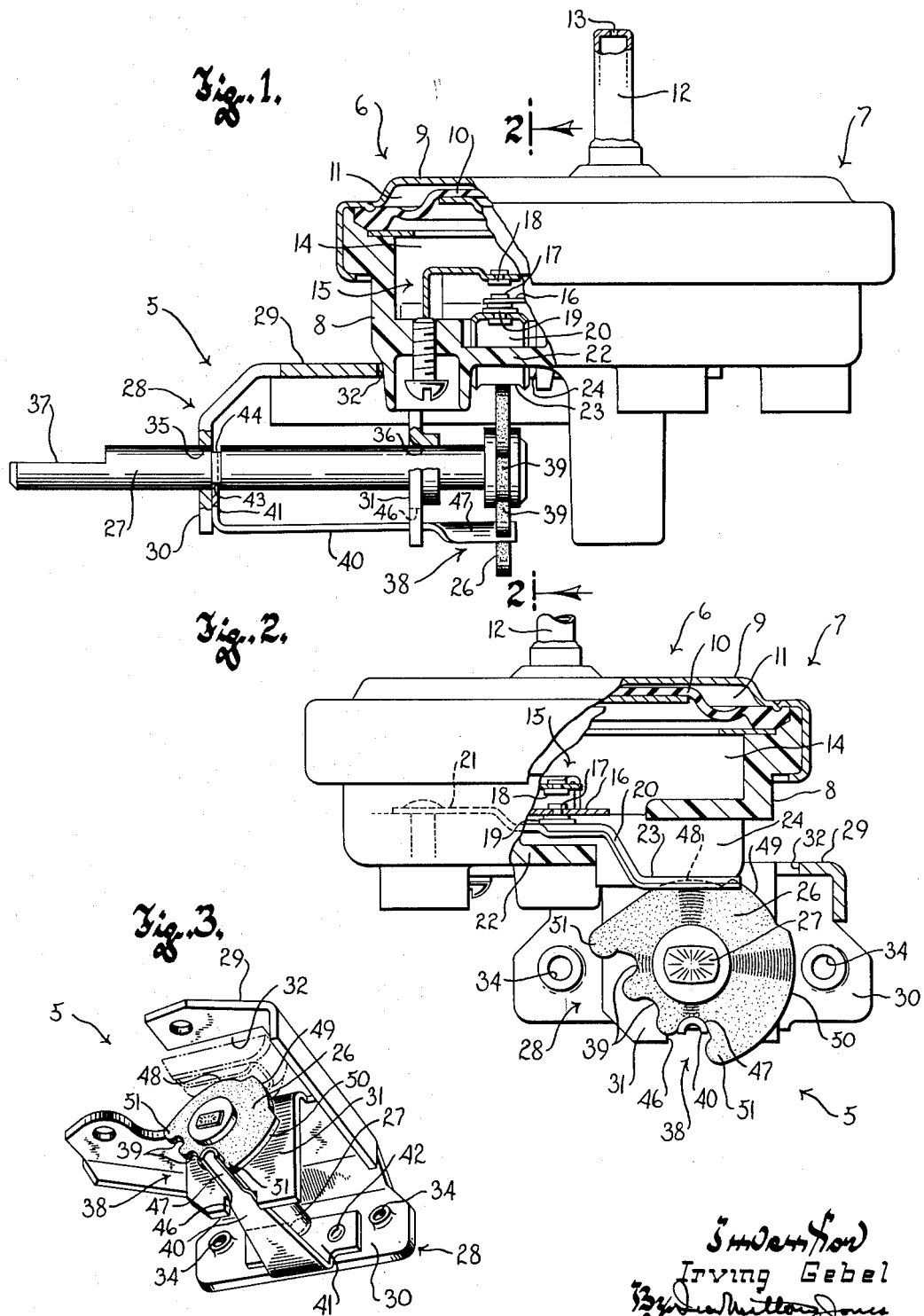
Inventor
Irving Gebel March 13, 1956     I. GEBEL     2,737,826
CONTROL UNIT FOR ELECTRICAL INSTRUMENTALITIES
Filed Feb. 14, 1955     2 Sheets—Sheet 2
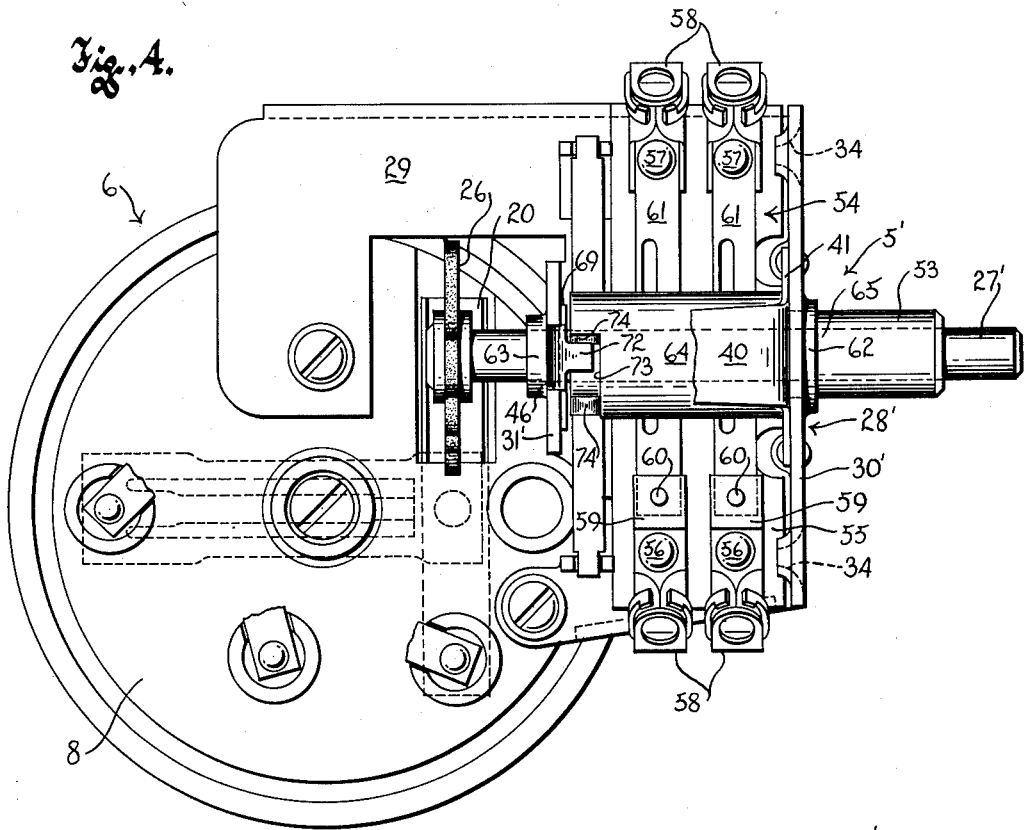
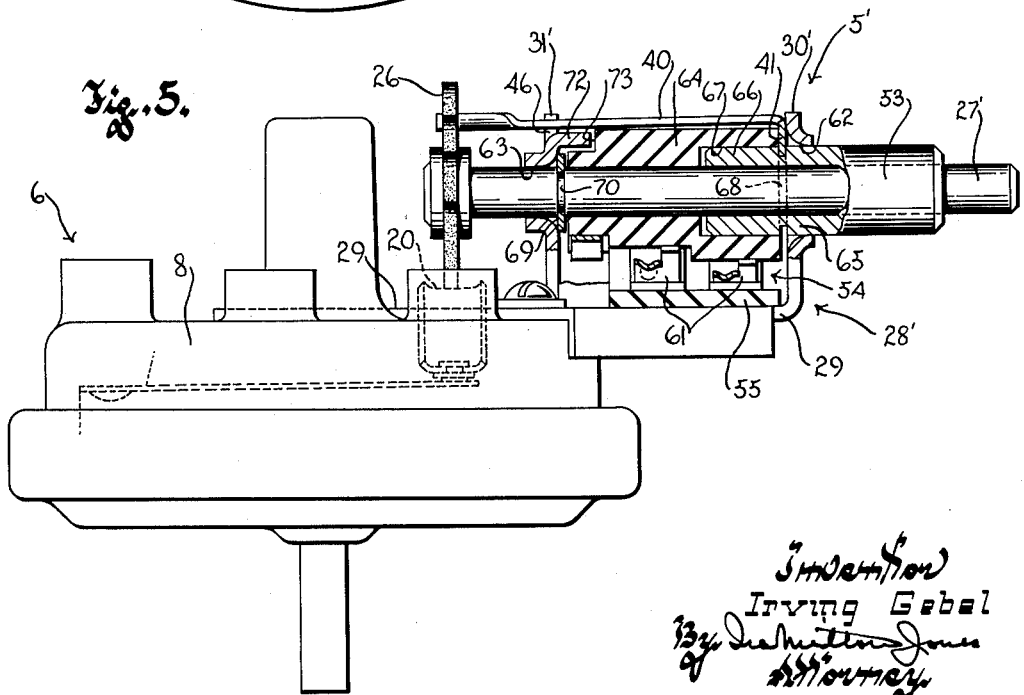
Inventor
Irving Gebel

United States Patent Office 2,737,826
Patented Mar. 13, 1956

2,737,826
CONTROL UNIT FOR ELECTRICAL INSTRUMENTALITIES

Irving Gebel, Oak Park, Ill., assignor to Soreng Products Corporation, Schiller Park, Ill., a corporation of Delaware Application February 14, 1955, Serial No. 487,880

The terminal portion of the term of the patent from January 24, 1973, has been disclaimed and dedicated to the Public 8 Claims. (Cl. 74—527)

This application is in part a division of the copending joint application of Edgar M. Soreng and Irvin Gebel, Serial No. 298,873, filed July 14, 1952, now Patent No. 2,720,564 issued October 11, 1955 and it is also a continuation of part of my later copending application Serial No. 403,755, filed January 13, 1954.

The earlier of said copending applications relates to a fluid pressure operated switch and the control device therein disclosed for regulating the operating characteristics of the switch constitutes the main embodiment of the invention presented in this application. The later of said copending applications discloses a modified version of said control device, and the remaining part of the invention presented in this application concerns features of said modified control device which are closely related to those of the control device of said joint application.

Fluid pressure operated switches of the type herein referred to are particularly useful in automatic washing machines, although their utility is by no means restricted to such devices. Since their application to automatic washing machines best illustrates the manner of their use, the pressure operated switch and especially the control means therefor will be described with particular reference to an installation in a washing machine, and specifically with reference to the manner in which the control means is employed to adjustably predetermine the volume of washing liquor or water to be delivered into the tub of a washing machine in one instance, as well as to regulate the temperature of the water thus delivered to the tub in another instance.

In most automatic washing machines presently in use, the machine is filled with water through two water lines, one connecting with a source of hot water and the other with a source of cold water. An electromagnetic valve in each of these water supply lines must be opened to admit water into the machine, and it is customary to provide a temperature control switch instrumentality to enable selection of the desired temperature of the water used to fill the machine.

Thus, for instance, when it is desired to fill the machine with hot water, the temperature selecting switch is manually set to effect energization and opening of only the electromagnetic valve in the hot water line, and the tub of the machine will fill with hot water to a predetermined level determined by a pressure operated water level switch, governing energization of both of said electromagnetic valves. The level control switch is opened automatically at the time water of the desired temperature reaches a predetermined level in the tub of the machine to effect deenergization and closure of the electromagnetic valve in the hot water line.

A similar procedure is followed when it is desired to fill the machine with cold water, it being understood that the temperature selecting switch is adjusted by an operator of the machine to effect energization and opening of only the electromagnetic valve in the cold water line. If it is desired to fill the machine with warm water, the temperature selecting switch is manually adjusted to effect simultaneous energization and opening of both electromagnetic valves to allow hot and cold water together to enter the machine.

In a washing machine of the type herein referred to, it is also desirable to provide for automatic filling of the machine to any one of a number of different levels so that a saving of hot water can be effected when it is desired to wash smaller than average loads of clothes. This feature has been realized in the past by the provision of a manually adjustable stationary contact in the pressure operated switch, to allow presetting of said stationary contact to one or more positions representing different water levels for the machine.

It is an object of the present invention to provide a novel control unit for pressure operated switches of the character described which facilitates adjustment of the stationary contact to any of a number of different positions, representing different water levels for the machine.

More specifically, this invention has as its object the provision of a control unit of the character described which embodies a manually rotatable shaft for effecting adjustment of the stationary contact of a pressure switch or the like, and has a simple and inexpensive indexing mechanism for arresting rotation of the control shaft at any of a number of predetermined positions representing different positions of adjustment of the stationary contact.

In this respect, it is a further object of this invention to provide a control unit of the character described with a cam fixed on the control shaft of the unit, one peripheral portion of the cam being cooperable with an adjustable element of an associated instrumentality to effect a change in the position of said adjustable element in consequence of rotation of the control shaft and another peripheral portion of said cam being cooperable with a detent finger on the control unit to arrest rotation of the cam at any of a number of different positions of adjustment of said adjustable element.

Still another purpose of this invention resides in the provision of a control unit of the character described which has the combined functions of adjustably predetermining the water level and temperature when used in conjunction with a pressure operated switch in the manner described.

Still another feature of this invention resides in the provision of a fill control unit having a pair of coaxial inner and outer operating shafts one of which provides for control of a water temperature selecting switch and the other of which provides for adjustment of the stationary contact of a pressure sensitive water level selecting instrumentality which may be readily attached to a mounting bracket on the control unit.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiments of the invention constructed according to the best modes so far devised for the practical application of the principles thereof, and in which:

Figure 1 is a view partly in side elevation and partly in section and illustrating the control unit of this invention attached to a pressure operated switch in a position to effect adjustment of the stationary contact of the switch;

Figure 2 is a cross sectional view taken on the plane of the line 2—2 in Figure 1;

Figure 3 is a perspective view of the control unit of this invention detached from the pressure operated switch instrumentality;

Figure 4 is a plan view of the control unit of this invention modified by the incorporation of a pair of water temperature controlling switches and shown in position on a pressure operated switch; and Figure 5 is a side elevational view of the modified device shown in Figure 4 but with portions thereof broken away and shown in section.

Referring now more particularly to the accompanying drawings in which like numerals indicate like parts throughout the several views, the numeral 5 designates generally the control unit of this invention shown in position upon a pressure operated switch instrumentality 6 to govern the operating characteristics of the switch.

The installation shown in Figures 1 and 2 is the same as that disclosed in the joint copending application of Edgar M. Soreng and Irving Gebel, Serial No. 298,873, filed July 14, 1952, now Patent No. 2,720,564, and the control unit 5 of Figures 1, 2 and 3 comprises the divisible subject matter of said joint copending application. Also reference may be had to the latter for a more detailed description of the pressure operated switch instrumentality 6.

It will be sufficient to note herein that the pressure operated switch instrumentality includes a housing 7 comprising a shallow cup-like insulative body portion 8 open at its top and a closely fitting metal cover 9 closing the open top of the body portion. A diaphragm 10 of rubber or other suitable flexible material extends laterally across the interior of the housing and has its peripheral portion clamped between the cover and rim portion of the cup-like body, and the diaphragm divides the housing into two compartments, namely an upper fluid tight compartment or diaphragm chamber 11 into which air, water or other liquid may be introduced through an inlet tube 12 having an orifice 13 in its outer end, and a lower switch compartment 14 in which is housed the switch mechanism 15 that is actuated by the diaphragm.

The switch mechanism 15 is of the snap actuated type and comprises a movable contact blade 16 having a contact point 17 fixed to its free end and movable up and down into and out of engagement with an upper fixed contact 18 and a lower adjustable stationary contact 19. The movable contact blade 16 is biased in the direction to normally maintain the contact point 17 in engagement with the lower contact 19. The contact 19 is made adjustable toward and from the upper fixed contact 18 to enable adjustment of the amount of fluid pressure which will be required to actuate the switch, that is, to effect snap actuation of the contact blade in an upward direction to disengage the movable contact from the lower contact 19 and bring it into engagement with the upper fixed contact 18.

To provide for such adjustment, the lower stationary contact 19 is carried on the medial portion of a flexible arm 20 which has one end portion 21 thereof anchored to the end wall 22 of the cup-like body portion of the housing, and has its free end portion 23 extending downwardly through an opening 24 in said end wall 22 and into engagement with the periphery of a cam 26 at the exterior of the housing and against which the arm is biased. This cam forms part of the control unit of this invention, and it is rotatable to effect either upward or downward adjustment of the lower stationary contact 19 to thus provide for variation of the amount of pressure imposed upon the diaphragm 10 necessary to effect snap actuation of the switch mechanism 15 in the direction to disengage the movable contact 17 from the lower stationary contact 19.

The cam 26 of the control unit is fixed on the rear end of a manually rotating control shaft 27 supported by a bracket 28 secured to the exterior of the end wall 22 of the housing for the pressure operated switch instrumentality. The bracket 28 is an inexpensive sheet metal stamping having a flat base 29 and upright spaced apart front and rear flanges 30 and 31, respectively, bent from the base to extend to one side thereof substantially perpendicular to the plane of the base. The flange 30, of course, is bent from the front end of the base, while the rear flange 31 is struck from the intermediate portion of the base to be opposite and parallel to the front flange and to leave an aperture 32 in the base intermediate its front and rear ends in edgewise alignment with the cam 26 and through which the free end portion 23 of the arm carrying the lower stationary contact 19 of the switch mechanism projects for engagement with the periphery of the cam.

The bracket 28 serves not only to mount the control unit on a panel of an automatic washing machine, but also provides a means for mounting the pressure operated switch instrumentality 6 on the machine. For this purpose, the bracket 28 is securable to the housing of the pressure operated switch instrumentality with the flat base 29 of the bracket flatwise engaged with the end wall of the cup-like insulated housing section 8 of the switch and with the front flange 30 of the bracket disposed a distance laterally outwardly from one side of the housing of the switch, as seen best in Figure 1. Spaced holes 34 in the front flange 30 of the bracket are provided to receive screws or rivets or other fastening means by which the control unit and, hence, the pressure operated switch instrumentality may be mounted on a panel of a washing machine with the entire assembly behind said panel.

The control shaft 27 is journalled in aligned holes 35 and 36 in the front and rear flanges 30 and 31 respectively, of the bracket for rotation on a fixed axis parallel to the base 29 of the bracket. The shaft 27 projects forwardly beyond the front flange 30 and is adapted to pass through the panel or wall of the housing of the washing machine upon which the control unit is mounted. A control knob, not shown, may be secured to the front end of the shaft which may have a flat portion 37 thereon for that purpose, so that the shaft and, hence, the cam 26 fixed thereto may be readily turned manually to effect adjustment of the lower stationary contact 19 to any one of several positions. These positions of adjustment are determined by novel indexing mechanism, generally designated 38 and which comprises a series of circumferentially spaced detent notches 39 in the peripheral portion of the cam generally opposite that portion of its periphery which is engaged by the free end portion 23 of the contact arm, and a detent finger 40 which is engageable in any one of the detent notches.

The indexing finger 40 is stamped from suitable resilient metal and has an upturned attaching base 41 by which the indexing finger is secured to the mounting bracket 28, by having the base riveted as at 42 to the front flange 30 of the bracket with the base of the finger overlying the inner surface of the flange. The attaching base 41 also serves to hold the control shaft 27 against axial displacement with respect to the mounting bracket 28, and for this purpose, the base has an edge portion 43 which enters an annular groove 44 in the control shaft to constitute the sole means for holding the shaft against axial sliding movement in its bearings and for properly locating the cam 26 with respect to the aperture 32 in the base of the bracket and, consequently, with respect to the free end portion 23 of the contact arm when the pressure operated switch is secured to the base of the bracket.

The indexing finger 40 projects rearwardly from the attaching base 41 substantially parallel to the control shaft 27, through an opening 46 in the rear flange 31 of the bracket, and has a rounded free end portion 47 shaped to snugly fit in any one of the detent notches 39 in the cam. In the embodiments of the invention shown in the drawings the opening 46 is defined by a notch opening to the outer edge of the rear flange and the opposing side edges of which provide abutments.

As seen best in Figure 2, the cam is provided with three detent notches equispaced circumferentially at that portion of the periphery of the cam which is remote from the base 29 and, more particularly, the free end portion 23 of the contact arm. Each of the detent notches is diametrically opposite a lobe on the cam, and these lobes are radially spaced different distances from the axis of rotation of the cam. With the position of the detent mechanism seen in Figure 2, the contact arm bears against a lobe 48 of the cam which has least throw. Upon counterclockwise rotation of the cam, as viewed in Figure 2, to bring the rounded free end portion 47 of the detent finger into the middle detent notch, the second lobe 49 of the cam is brought to bear against the free end of the contact arm to position the contact 19 carried thereby a short distance closer to the fixed stationary contact 18. Likewise, further counterclockwise rotation of the cam to bring the last detent notch 39 into alignment with the free end portion of the detent finger brings the cam lobe 50 of greatest throw to bear upon the free end portion of the contact arm to position the adjustable stationary contact carried thereby closest to the fixed contact 18.

Attention is directed to the fact that the detent notches 39 in the cam are relatively deep. This assures the best possible detent action and tends to prevent accidental rotation of the control shaft 27 beyond the desired setting of the cam. Aside from its function of arresting rotation of the control shaft at the different defined positions of adjustment of the contact arm 20, the detent finger also serves to define the limits of rotation of the control shaft. To this end, stop abutments 51 are provided on the cam at those sides of the two remote detent notches 39 which are adjacent to the unnotched periphery of the cam, for engagement with the sides of the rounded free end portion of the indexing finger.

As stated, it is highly desirable to provide a pronounced detent action through the provision of relatively deep detent notches in the cam and to employ the detent finger as a means of limiting rotation of the control shaft. However, this introduces a serious problem which results from the necessity of forming the index finger of relatively light weight highly resilient material to enable the same to be flexed a substantial amount away from the axis of the control shaft during the times it passes over the teeth between the detent notches. It is essential of course, that the detent finger have substantial length as well as a comparatively light cross section to facilitate flexure of the finger when the cam is rotated to different settings. Because of these requirements, however, the index finger is substantially weak and incapable of withstanding the substantial lateral twisting forces which may be applied thereto during rotation of the cam from one position to another but, more especially, at such times as when it is engaged in either one of the remote detent notches and an operator of the machine accidentally tries to rotate the shaft in the wrong direction. This would be comparable to applying a force to the control shaft in a direction tending to rotate the cam in the clockwise direction seen in Figure 2, beyond the limit of rotation established by the engagement of the detent finger with the abutment 51 on the cam at that time.

The control knob ordinarily mounted on the outer end of the control shaft is relatively large in diameter, as is well known, and the operator may apply substantial torque thereto which, if applied in the wrong direction, would twist the index finger edgewise, in a direction substantially parallel to the control shaft. This might easily lead to deformation or breakage of the index finger.

It is one of the features of this invention that protection is afforded against such damage to the index finger by reason of the fact that a portion thereof closely adjacent to its outer free end is received in the opening or notch 46 in the rear flange 31 of the mounting bracket. This notch has sufficient depth in a direction perpendicular to the control shaft to accommodate all of the required flexing motion of the index finger. The width of the notch, however, is such that the index finger will be brought into engagement with one side or the other of the notch whenever the finger is flexed edgewise, either as a result of normal rotation of the cam or by an operator unknowingly attempting to rotate the shaft beyond one of its limits, to thus positively preclude deformation of or damage to the finger.

The control unit thus far described is useful only to effect adjustment of the level of washing liquid required to be introduced into the tub of an automatic washing machine. Other switch instrumentalities separate from the control unit as well as the pressure switch must be employed to control the temperature of the water used to fill the machine.

However, water temperature controlling switch instrumentalities may be incorporated in the control unit so that the latter then becomes both a water level and water temperature controlling device. Such a control unit is illustrated in Figures 4 and 5 of the drawings, and the specific construction and arrangement of the temperature controlling switch mechanism shown in these figures, is fully disclosed and claimed in my copending application, Serial No. 403,755, filed January 13, 1954.

As will appear in greater detail hereinafter, it is a feature of the dual purpose control instrumentality shown in Figures 4 and 5 that the selection of water temperatures and levels is simplified through the provision of operating shafts for each of the instrumentalities which shafts are telescoped one within the other. The outer shaft 53 controls the switching necessary for selection of the temperature of the water used to fill the machine, while the inner shaft 27' provides for adjustment of the contact arm 20 of the pressure operated switch. In most respects, the control unit 5' is similar to that previously described and likewise comprises a mounting bracket having a flat base 29' securable to the end wall of the cup-like body portion 8' of the housing for the pressure operated switch to locate the bracket with the control cam 26' thereon in edgewise alignment with the outer end of the contact arm 20' of the pressure switch, and with the cam bearing thereagainst. It also has an index finger 40' similar to that of the first described embodiment of the invention cooperable with detent notches in the cam 26' to define the different positions of rotation of the control shaft 27' at which the contact arm of the switch is held in its different positions of adjustment.

In the control unit 5' shown in Figures 4 and 5, however, the space between the front and rear flanges 30' and 31', respectively, of the mounting bracket accommodates the temperature selecting switch device 54.

The temperature selecting switch mechanism comprises an elongated relatively flat insulating terminal head 55 extending transversely across the base 29 of the mounting bracket, between the front and rear flanges thereof and lying flatwise upon the base. Preferably the insulating terminal head and the mounting bracket 28' form a sub-assembly, the head being secured to the base of the bracket by pairs of rivets 56 and 57 passing through the opposite ends of the terminal head at each side of the control shaft axis and insulated from the base by bushings, not shown, of insulating material. Each of these rivets also secures a female electrical connector 58 to the top side of the insulating terminal head. In addition, the rivets 56 at one end of the terminal head fixedly attach thereto a pair of offset metal clips 59, each of which carries a stationary contact 60 at a distance above and facing the terminal head. The rivets 57 at the opposite end of the terminal head provide for securement of one end of a flexible movable contactor blade 61 to the terminal head, with the contactor blades extending lengthwise of the terminal head substantially parallel to the flanges and the base of the mounting bracket, crosswise of the axis of the control shaft. These contact blades extend beneath the control shaft and their free end portions lie beneath and are cooperable with the stationary contacts 60 on the contact clips 59. The contact blades 61 are preferably biased upwardly into engagement with the contacts 60 except when cammed downwardly away from their respective stationary contacts, in consequence of rotation of the outer shaft 53.

The operating shaft assembly which comprises the outer and inner shafts 53 and 27', respectively, is rotatably carried by the mounting bracket in bearings 62 and 63 formed in the front and rear flanges, respectively, of the mounting bracket. These bearings support the two shafts for rotation on a common axis substantially normal to the flanges and spaced a distance above and parallel to the plane of the base of the bracket sufficient to accommodate the temperature selection switch 54 beneath the operating shaft assembly. The outer shaft 53, of course, is of tubular construction and has an inner section 64 comprising the rotor of the temperature selector switch, and a coaxial front section 65, or driver, slightly smaller in diameter than the rotor.

The inner section or rotor 64 is comprised of insulating material and its length is such as to closely fit between the front and rear flanges of the mounting bracket. In addition, the rotor sleeve 64 has a rotation transmitting connection with the front section 65 of the outer shaft, which connection may be provided by a non-circular rear end portion 66 on the driver engaging in a similar non-circular counter bore 67 in the front of the rotor. The forward sleeve or driver 65 of the outer shaft may conveniently be made of metal and it passes forwardly through the front flange 30' of the bracket to be rotatably accommodated in the bearing 62 thereof and to have its forward extremity accessible for manual actuation, as by a knob or the like, not shown, attached thereto.

The inner shaft 27' is rotatable inside the outer shaft and projects through both flanges of the mounting bracket. Its forward extremity extends slightly beyond that of the outer shaft to be accessible for manual actuation by a suitable control knob thereon, not shown, while its rear extremity projects a distance beyond the rear flange of the bracket and has the control cam 26 fixed thereto. The bearing 63 in the rear flange 31' of the bracket rotatably receives and supports the rear end portion of the inner shaft. Consequently, rotation of the inner shaft 27' effects adjustment of the contact arm 20 of the pressure switch in the same manner as that described heretofore with rotation of the inner shaft being arrested at each setting of the shaft by the engagement by the outer end portion of the detent finger 40 in any one of the detent notches of the cam 26. In this case also, the detent finger has a portion adjacent to its rear end slidingly received in a notch 46 in the rear flange of the bracket opening to its outer edge to prevent damage to the index finger which would otherwise result from the substantial twisting force applied thereto during rotation of the cam or at the limits of rotation of the inner control shaft 27'.

While the insulating sleeve or rotor 64 of the water temperature switch is held against axial motion relative to the mounting bracket by its confinement between the front and rear flanges of the mounting bracket, it is necessary to provide a retainer for the outer section or driver 65 of the shaft 53. The retaining means for the driver comprises the plate-like base 41 of the index finger which is fixed to the inner surface of the front flange 30' of the mounting bracket and has an edge portion entering an annular groove 68 in the exterior of the driver to lock the same against axial motion in its bearing 62.

It will be understood, of course, that the edge portion of the base of the index finger which enters the groove in the driver may be provided by the bottom and sides of a notch formed in the base of the finger and opening to its edge remote from the finger, so that the base of the finger substantially straddles the driver in a manner described at greater length in my aforesaid copending application, Serial No. 403,755.

The inner shaft 27' is held against axial motion relative to the mounting bracket by a bifurcated retaining plate 69, confined between the rear flange 31' of the bracket and the adjacent rear end of the rotor 64, with the legs of the plate straddling the shaft 27' and engaging in an annular groove 70 therein. It is a feature of the control unit shown in Figures 4 and 5 that the notch 46 in the rear flange of the mounting bracket which steadies and reinforces the index finger against lateral deformation is provided by striking a tab 72 forwardly from the outer edge portion of the rear flange. The tab 72 thus formed projects into an arcuate recess 73 in the adjacent rear end portion of the rotor 64, to have engagement with circumferentially spaced abutments 74 at the ends of the recess to thus limit rotation of the outer shaft.

The specific switch mechanism 54, the manner in which rotation of the outer shaft effects opening and closing of the switches, and the detent means for arresting rotation of the outer shaft at these different switch on and off positions, all are features which are claimed in my copending application, Serial No. 403,755, and form no part of this invention. Reference may be had to my aforesaid copending application for a detailed disclosure thereof.

It is sufficient to note that one contactor 61 and its cooperating stationary contact 60 controls the energization and deenergization of the electromagnetic valve in the hot water supply line for the washing machine, while the other contactor and its cooperating stationary contact 60 controls energization and deenergization of the electromagnetic valve in the cold water supply line for the machine. Hence, the outer shaft may be rotated to positions at which the rotor 64 effects closure of either or both of the contacts, while the pressure switch instrumentality associated therewith, governs the level of water, either hot or cold or a mixture thereof, which is delivered to the machine and is thus capable of effecting closure of both of said electromagnetic valves in the water supply line.

From the foregoing description taken together with the accompanying drawings, it will be readily apparent to those skilled in the art, that this invention provides a control unit for automatic washing machines and the like which features detent mechanism of exceptional simplicity and ruggedness and which has the further advantage of being capable of manufacture at a low cost.

What I claim as my invention is:

1. In an instrumentality of the character described a combination mounting structure and indexing mechanism, comprising: a stamped and formed bracket having opposing spaced apart front and back walls; means on the front wall providing for the securement of the bracket to a support, said front and back walls having aligned holes; a control shaft journalled in said holes; a cam on the shaft near the rear bracket wall and having detent notches; a resilient indexing finger having an attaching base; the control shaft having a circumferential groove of a size to receive a marginal edge portion of the attaching base; and means securing the attaching base of the indexing finger to the front wall of the bracket with said marginal edge portion of the attaching base engaged in the circumferential groove in the control shaft to thereby secure the shaft against axial displacement and with the indexing finger extending rearwardly lengthwise of the shaft and having its free rear end portion bearing resiliently against the cam to coact with the detent notches therein.

2. A control unit of the character described comprising: a mounting bracket having a flat base and spaced apart front and rear flanges projecting from the base; an operating shaft rotatably supported by said flanges and having a rear portion projecting behind said rear flange and a portion projecting in front of the front flange to be accessible for manual manipulation; a cam on the projecting rear portion of said shaft having a plurality of circumferentially spaced notches in its periphery; and a resilient finger carried by the front flange and extending rearwardly lengthwise of the shaft to have its rear end portion engage in said notches in the cam to cooperate therewith in providing detents which define the positions of the cam, said finger being flexible toward and from the shaft and being steadied against distortion transversely to its direction of flexure by having a portion thereof received between the opposed edges of an opening in the rear flange.

3. A control unit of the character described comprising: a mounting bracket having a flat base and spaced apart front and rear flanges projecting from the base; an operating shaft rotatably supported by said flanges at a location to one side of the base and having a portion projecting beyond one of the flanges to be accessible for manual manipulation; a cam on said shaft near the rear flange having a plurality of circumferentially spaced notches in its periphery; a resilient finger carried by the front flange and extending rearwardly lengthwise of the shaft with a portion of said finger spaced from the front flange flexible toward and from the shaft and engaged in the notched periphery of the cam to cooperate therewith in providing detents which define the positions of the cam; and means for steadying said finger against distortion transversely to its direction of flexure comprising a pair of opposite abutments on the rear flange between which a portion of said finger is guidingly received, said abutments being spaced apart a distance substantially equal to the width of said portion of the finger and extending substantially parallel to the path of flexure of the finger and comprising the opposed edge portions of an opening in the rear flange.

4. A control unit of the character described comprising: a bracket having a pair of front and rear supporting members in fixed spaced apart relationship; manually rotatable actuating means conjointly carried by said supporting members; a cam on said actuating means near the rear supporting member having a plurality of circumferentially spaced notches therein; a resilient finger carried by the front supporting member and extending rearwardly therefrom toward the cam with a rear portion of said finger flexible toward and from and engaged with the notched portion of the cam to cooperate therewith in providing detents which define the positions of the actuating means; and means for steadying said finger against distortion transversely to its direction of flexure comprising a pair of opposite abutments on the rear supporting member between which a portion of said finger is received, said abutments being spaced apart a distance substantially equal to the width of said portion of the finger and extending substantially parallel to the path of flexure of the finger and comprising the opposed edge portions of an opening in the rear supporting member.

5. The control unit of claim 4 wherein said resilient finger projects rearwardly from a plate secured to said front supporting member to mount the finger, and wherein an edge portion of said plate is engaged in a circumferential groove in said rotatable actuating means to preclude axial displacement thereof.

6. A control unit of the character described comprising: a mounting bracket having a base and spaced apart front and rear flanges projecting upwardly from the base, said rear flange having a notch opening to one side thereof provided by a tab bent forwardly out of the plane of the rear flange; an operating shaft assembly rotatably journaled in said flanges and including a tubular outer shaft having an arcuate notch at its rear defining circumferentially spaced abutments on the outer shaft which engage said tab to define the limits of rotation of the outer shaft, and a coaxial inner shaft rotatable inside the outer shaft, one end portion of the inner shaft projecting rearwardly beyond the adjacent end of the outer shaft and terminating behind the rear flange, and the other end portions of said shafts projecting forwardly through the front flange so as to be accessible for independent manual actuation from a location ahead of the front flange; a cam on the rearwardly projecting portion of the inner shaft having a plurality of circumferentially spaced notches in its periphery; and a resilient finger carried by the front flange and extending rearwardly over the shaft assembly to have its rear end portion engage in said notches in the cam to cooperate therewith in providing detents which define the positions of the cam, said finger being engaged in said notch in the rear flange to be steadied by the opposed side edges thereof against distortion transversely to its plane of flexure in consequence of sideward forces imposed upon the finger upon rotation of the cam from one of its positions to another.

7. The control unit of claim 6 further characterized by the provision of rotation stops on the cam at the circumferential ends of the notched portion of its periphery, engageable with said resiliently flexible finger to define the limits of rotation of the cam.

8. The control unit of claim 6 wherein said resilient finger projects rearwardly from a flat plate substantially perpendicular to the finger; and wherein said flat plate is secured flatwise to the front flange, with an edge portion of said flat plate engaged in a circumferential groove in the outer shaft to prevent axial displacement thereof.

References Cited in the file of this patent

UNITED STATES PATENTS

| 1,887,878 | Smith | Nov. 15, 1932 |
| 2,636,093 | Clark | Apr. 21, 1953 |

FOREIGN PATENTS

| 135,751 | Australia | Dec. 23, 1949 |